(12) United States Patent
Omata et al.

(10) Patent No.: US 11,741,855 B2
(45) Date of Patent: Aug. 29, 2023

(54) DEVICE FOR TRAINING IN OPHTHALMIC SURGERY

(71) Applicant: MITSUI CHEMICALS, INC., Tokyo (JP)

(72) Inventors: Seiji Omata, Nagoya (JP); Taisuke Masuda, Nagoya (JP); Hisataka Maruyama, Nagoya (JP); Fumihito Arai, Nagoya (JP)

(73) Assignee: MITSUI CHEMICALS, INC., Tokyo (JP)

( * ) Notice: Subject to any disclaimer, the term of this patent is extended or adjusted under 35 U.S.C. 154(b) by 779 days.

(21) Appl. No.: 16/492,597

(22) PCT Filed: Nov. 30, 2017

(86) PCT No.: PCT/JP2017/043154
§ 371 (c)(1),
(2) Date: Sep. 9, 2019

(87) PCT Pub. No.: WO2019/026304
PCT Pub. Date: Feb. 7, 2019

(65) Prior Publication Data
US 2021/0142696 A1    May 13, 2021

(30) Foreign Application Priority Data
Jul. 31, 2017    (JP) ................. 2017-148375

(51) Int. Cl.
*G09B 23/24*    (2006.01)
*G09B 23/32*    (2006.01)
*G09B 23/34*    (2006.01)

(52) U.S. Cl.
CPC ............. *G09B 23/32* (2013.01); *G09B 23/34* (2013.01)

(58) Field of Classification Search
CPC ................................. G09B 23/32; G09B 23/34
(Continued)

(56) References Cited

U.S. PATENT DOCUMENTS 4,865,552 A * 9/1989 Maloney ................ G09B 23/30
434/271
2010/0041306 A1 * 2/2010 Yang ........................ A63H 3/40
446/343
(Continued)

FOREIGN PATENT DOCUMENTS

JP    46-40299 B1    11/1971
JP    H01-111267 U    7/1989
(Continued)

OTHER PUBLICATIONS

International Search Report dated Feb. 6, 2018, issued in International Application No. PCT/JP2017/043154; with partial English translation.
(Continued)

*Primary Examiner* — Kesha Frisby
(74) *Attorney, Agent, or Firm* — McDermott Will & Emery LLP

(57) ABSTRACT

The present invention addresses the problem of providing a device for training in ophthalmic surgery that can be used for training in glaucoma surgery. The problem can be solved by a device for training in ophthalmic surgery including: a simulated-eyeball pedestal having a recess into which a simulated eyeball can be directly or indirectly inserted; a simulated eyeball insertable into the simulated-eyeball pedestal, or a member for retaining a simulated eyeball that retains a simulated eyeball, the member for retaining the simulated eyeball being insertable into the simulated-eyeball pedestal; and a mechanism for generating a restoring force that generates a force for restoring a position of the simulated eyeball or the simulated-eyeball retaining member (Continued)

1, 1 C

A

B toward a normal state with respect to the simulated-eyeball pedestal; the simulated eyeball or the member for retaining the simulated eyeball rotating along the recess of the simulated-eyeball pedestal.

12 Claims, 5 Drawing Sheets

(58) Field of Classification Search
USPC .......................................................... 434/267
See application file for complete search history.

(56) References Cited

U.S. PATENT DOCUMENTS

| 2011/0066239 | A1* | 3/2011 | Smoot | G09B 23/30 |
| | | | | 623/6.64 |
| 2012/0021397 | A1* | 1/2012 | Van Dalen | G09B 23/30 |
| | | | | 434/271 |
| 2013/0030524 | A1* | 1/2013 | Akura | G09B 23/34 |
| | | | | 623/6.13 |
| 2016/0063898 | A1 | 3/2016 | Bernal | |
| 2016/0098944 | A1* | 4/2016 | Lin | G09B 23/32 |
| | | | | 434/271 |

FOREIGN PATENT DOCUMENTS

| JP | 2-502224 A | 7/1990 |
| WO | 2011/125136 A1 | 10/2011 |

OTHER PUBLICATIONS

Written Opinion of the International Searching Authority dated Feb. 6, 2018, issued in International Application No. PCT/JP2017/043154; with partial English translation.

* cited by examiner

DEVICE FOR TRAINING IN OPHTHALMIC SURGERY

CROSS-REFERENCE OF RELATED APPLICATIONS

This application is the U.S. National Phase under 35 U.S.C. § 371 of International Patent Application No. PCT/JP2017/043154, filed on Nov. 30, 2017, which in turn claims the benefit of Japanese Application No. 2017-148375, filed on Jul. 31, 2017, the entire disclosures of which Applications are incorporated by reference herein.

FIELD OF THE INVENTION

The present disclosure relates to a device for training in ophthalmic surgery.

DESCRIPTION OF THE RELATED ART

Numbers of ophthalmic surgery cases in Japan are said to be approximately 2,000,000 for cataract, 200,000 for glaucoma, and 20,000 for vitreoretinal surgery. Because ophthalmic surgery targets the extremely delicate tissue of the eye, proficiency in ophthalmic surgery requires a large amount of experience. However, because medical errors in surgery performed by less experienced physicians can lead to medical lawsuits, it is difficult for less experienced physicians to acquire surgical experience in a clinical setting. As a solution to this problem, a device for training in ophthalmic surgery is known whereby surgical training with a sensation close to that of human ophthalmic surgery is possible using a simulated eyeball, so that a physician can acquire a large amount of experience that approximates surgery extremely closely.

A simulated eye device for training in cataract surgery is known as an example of a device for training in ophthalmic surgery (see Patent Document 1). The simulated eye device described in Patent Document 1 is disclosed as being provided with a simulated nucleus corresponding to the lens nucleus of a human eye, and a simulated cortex corresponding to the lens cortex of a human eye. Patent Document 1 also discloses that by incorporating a magnet into a simulated eye and embedding an iron ball as a magnetic body in a pedestal, the simulated eye is able to move centered about a point of contact of the magnet and the magnetic body.

As another device for training in ophthalmic surgery, a device is also known in which a simulated eyeball is pressed against a face model by spring force of a wire, the device using a simulated eyeball in which an epiretinal membrane (ERM) as an object for vitreoretinal surgery and an inner limiting membrane (ILM) are layered on a bottom surface part of an intraocular space (see Patent Document 2).

A device for training in ophthalmic surgery is also known in which numerous screws are insertable into a housing interior from outside the housing, and a position of a simulated eyeball disposed in the housing can thereby be adjusted (see Patent Document 3).

[Patent Document 1] PCT International Publication No. WO 2011/125136

[Patent Document 2] Specification of US Patent Application Publication No. 2012/0021397

[Patent Document 3] Specification of US Patent Application Publication No. 2016/0063898

SUMMARY OF THE INVENTION

The main procedures in surgery for glaucoma are (1) trabeculectomy for making a bypass between the inside of the eye and the bottom of the conjunctiva (white of the eye) and causing intraocular fluid to drain into a pool created beneath the conjunctiva, and (2) trabeculotomy for making an incision in tissue of a drain tube in the eye to improve the efficiency of intraocular drainage. Both procedures involve thinly slicing the sclera in the white of the eye on the periphery of the cornea, and therefore necessitate placing the eyeball in a strabismus state. Therefore, during surgery, passing a thread through the white of the eye and pulling the thread causes the eyeball to rotate in the eye socket from a normal-state position to a strabismus position (5 to 50 degrees).

In a human eyeball, there is a restoring force that returns the eyeball to a normal state, and the eyeball returns to an original position thereof even when rotated by pulling of a thread. Therefore, during surgery, the restoring force of the eyeball and a pulling force on the eyeball are balanced by application of a weight or the like to an end of the thread after the eyeball is rotated by pulling of the thread. Specifically, when the sclera is thinly sliced by a scalpel, all three of the restoring force, the pulling force of the thread, and a pressing force of the scalpel act on the eyeball. During training for glaucoma surgery, these three forces must also be reproducible in a device for training in ophthalmic surgery. In other words, it is necessary to provide the device for training in ophthalmic surgery with a mechanism for generating a restoring force for returning a simulated eyeball to the normal state when a thread is passed through the simulated eyeball and the simulated eyeball is rotated by pulling of a thread.

However, the device for training in ophthalmic surgery described in Patent Document 1 was developed for cataract surgery, which is performed with the eyeball in the normal-state position. Although the simulated eyeball is disclosed as being movable in the invention described in Patent Document 1, the simulated eyeball merely moves centered about the point of contact of the pedestal and the simulated eyeball, and does not rotate in a member that corresponds to an eye socket. Consequently, the invention of Patent Document 1 has the drawback of not being able to reproduce eyeball movement that occurs during glaucoma surgery.

Although vitreoretinal surgery is also considered in the device for training in ophthalmic surgery described in Patent Document 2, a primary expectation for this device is cataract surgery. The device of Patent Document 2 also has a structure in which a simulated eyeball is pressed against a face model by spring force of a wire, and therefore has the drawback of being unable to reproduce eyeball movement that occurs during glaucoma surgery.

The device for training in ophthalmic surgery described in Patent Document 3 is said to enable training relating to cataract, glaucoma, cornea removal, and the like. However, this device is a mechanism in which numerous screws are inserted into a housing interior from outside the housing, and the position of a simulated eyeball in the housing is adjusted, and this device therefore has the drawback of being incapable of rotating the simulated eyeball in a member corresponding to an eye socket, and of imparting a restoring force to the simulated eyeball. As described above, most current devices for training in ophthalmic surgery are for cataract, and there is no known device for training in ophthalmic surgery that can reproduce movement of a simulated eyeball that corresponds to a process in glaucoma surgery.

The present disclosure was developed to address the drawbacks described above. As a result of concentrated investigation, the present inventors newly discovered that a process performed during glaucoma surgery can be reproduced by disposing a simulated eyeball, or a member for retaining a simulated eyeball that retains a simulated eyeball, to be able to rotate along a recess of a simulated-eyeball pedestal, and providing a mechanism for generating a restoring force that restores a position of the simulated eyeball or the member for retaining the simulated eyeball toward a normal state with respect to the simulated-eyeball pedestal.

Specifically, an object of the present invention is to provide a device for training in ophthalmic surgery that can be used for glaucoma surgery training.

The present disclosure relates to the device for training in ophthalmic surgery described below.

(1) A device for training in ophthalmic surgery comprising:

a simulated-eyeball pedestal having a recess into which a simulated eyeball can be directly or indirectly inserted;

a simulated eyeball insertable into said simulated-eyeball pedestal, or a member for retaining a simulated eyeball that retains a simulated eyeball and being insertable into said simulated-eyeball pedestal; and a mechanism for generating a restoring force that generates a force for restoring a position of said simulated eyeball or said member for retaining the simulated eyeball toward a normal state with respect to said simulated-eyeball pedestal, wherein said simulated eyeball or said member for retaining the simulated eyeball rotates along the recess of said simulated-eyeball pedestal.

(2) The device for training in ophthalmic surgery of (1) above, wherein:

said mechanism for generating the restoring force functions when the position of said simulated eyeball or said member for retaining the simulated eyeball is rotated 5 to 50 degrees from the normal state with respect to said simulated-eyeball pedestal.

(3) The device for training in ophthalmic surgery of (1) or (2) above, wherein:

said mechanism for generating the restoring force comprises:

a first magnet disposed in said simulated-eyeball pedestal or disposed outside said simulated-eyeball pedestal; and a second magnet disposed in said simulated eyeball or said member for retaining the simulated eyeball, and wherein said first magnet and said second magnet are disposed so that same poles thereof face each other to generate a repulsive force when said simulated eyeball or said member for retaining the simulated eyeball is rotated relative to said simulated-eyeball pedestal.

(4) The device for training in ophthalmic surgery of (3) above, wherein:

said second magnet is disposed further in an opening direction of the recess of said simulated-eyeball pedestal than said first magnet when said simulated eyeball or said member for retaining the simulated eyeball is inserted in said simulated-eyeball pedestal to be in the normal-state position.

(5) The device for training in ophthalmic surgery of (1) or (2) above, wherein:

said mechanism for generating the restoring force is an elastic member, one end of which is fixed to said simulated-eyeball pedestal, and another end of which is fixed to said simulated eyeball or said member for retaining the simulated eyeball.

(6) The device for training in ophthalmic surgery of any one of (1) through (5) above, wherein:

a through hole is formed in said simulated-eyeball pedestal.

(7) The device for training in ophthalmic surgery of any one of (1) through (6) above, further comprising:

a face plate having a hole for exposing the simulated eyeball; and a front head unit for engaging with said face plate.

(8) The device for training in ophthalmic surgery of (7) above, further comprising:

an angle adjustment mechanism for adjusting an angle of said face plate.

Through use of the device for training in ophthalmic surgery disclosed in the present application, a process performed during glaucoma surgery can be reproduced.

DESCRIPTION OF THE PREFERRED EMBODIMENTS

A device for training in ophthalmic surgery according to embodiments will be described in detail below with reference to the drawings. Members that have the same type of function are referred to by the same or similar reference symbols in the present specification. Repeated description of members that are referred to by the same or similar reference symbols is sometimes omitted.

First Embodiment

Figure 1:
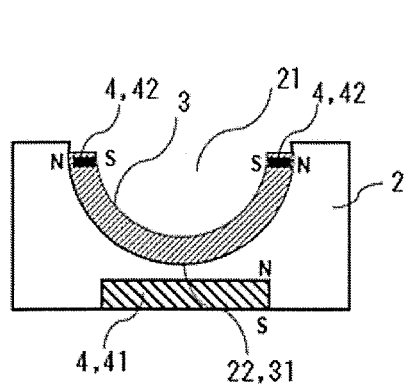
FIGS. 1A and 1B are schematic sectional views of a device for training in ophthalmic surgery 1A according to a first embodiment.
Figure 1:
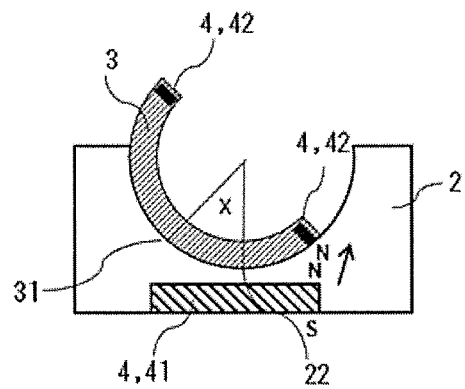

A device for training in ophthalmic surgery 1A according to a first embodiment will be described with reference to FIGS. 1A and 1B. FIGS. 1A and 1B are schematic sectional views of the device for training in ophthalmic surgery 1A of the first embodiment. Descriptions that are common to both FIGS. 1A and 1B sometimes refer to "FIG. 1" in the specification. The same applies for the other drawings.

A device for training in ophthalmic surgery 1 of the first embodiment is provided with a simulated-eyeball pedestal 2, a member for retaining a simulated eyeball 3 that retains a simulated eyeball, and a mechanism for generating a restoring force 4. In the first embodiment, the simulated-eyeball pedestal 2 is provided with a recess 21 into which the simulated eyeball can be indirectly inserted, or in other words, into which the member for retaining the simulated eyeball 3 that retains the simulated eyeball can be inserted. The recess 21 is not particularly limited insofar as the recess 21 has a shape in which the member for retaining the simulated eyeball 3 can be inserted/retained, and in which the member for retaining the simulated eyeball 3 can rotate along the recess. A substantially hemispherical curved surface or the like is cited as an example thereof.

Figure 2:
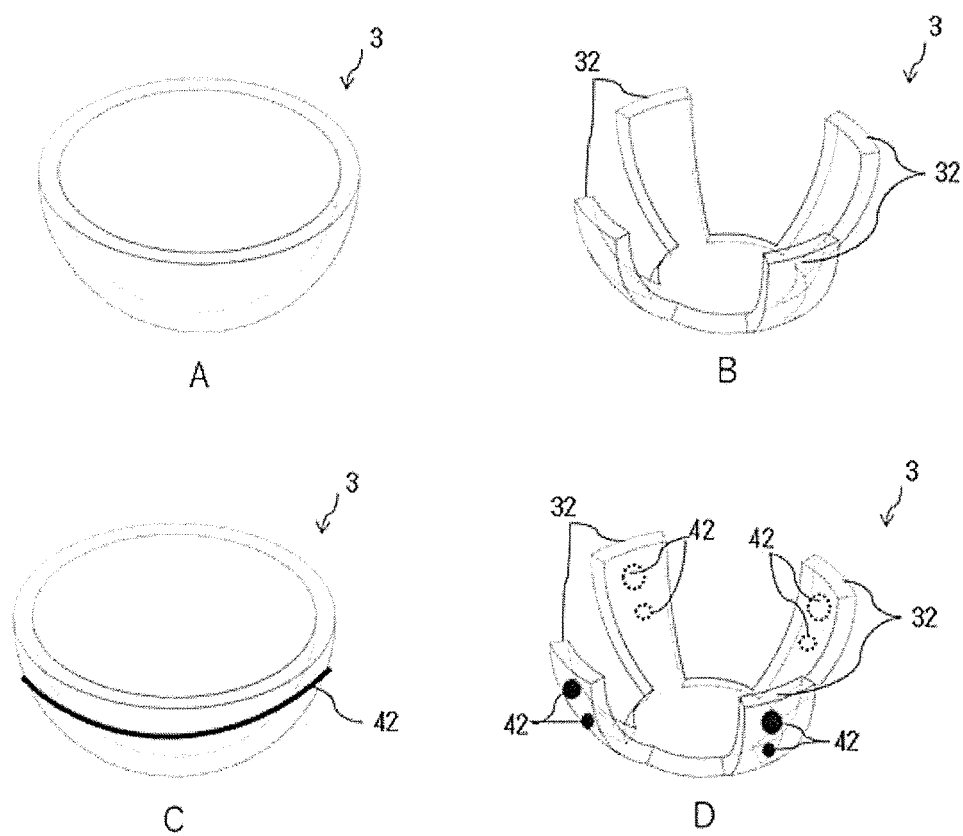
FIGS. 2A through 2D are views illustrating embodiments of a simulated-eyeball retaining member 3.

The member for retaining the simulated eyeball 3 is not particularly limited insofar as the member for retaining the simulated eyeball 3 is capable of retaining the simulated eyeball and can rotate along the recess 21 of the simulated-eyeball pedestal 2. FIGS. 2A and 2B are views illustrating embodiments of the member for retaining the simulated eyeball 3. Examples thereof include a substantially hemispherical cup-shaped member such as illustrated in FIG. 2A, a plurality of curved plate-shaped members 32 connected at a bottom thereof such as illustrated in FIG. 2B, and the like. In the embodiment illustrated in FIG. 2B, the plurality of plate-shaped members 32 are preferably formed at equal intervals.

In the first embodiment, the mechanism for generating the restoring force 4 is constituted from a first magnet 41 disposed in the simulated-eyeball pedestal 2, and second magnets 42 disposed in the member for retaining the simulated eyeball 3. As illustrated in FIG. 1, the first magnet 41 and the second magnets 42 are disposed so that same poles face each other when the member for retaining the simulated eyeball 3 is rotated relative to the simulated-eyeball pedestal 2. Therefore, when a thread is passed through the simulated eyeball and the simulated eyeball is caused to rotate during surgical training, the member for retaining the simulated eyeball 3 rotates as illustrated in FIG. 1B from a normal-state position illustrated in FIG. 1A. The first magnet 41 and the second magnets 42 come close together when the member for retaining the simulated eyeball 3 rotates to a predetermined angle, but because the first magnet 41 and the second magnets 42 are disposed so that same poles thereof (N poles in FIG. 1) face each other, a repulsive force (restoring force) occurs. As a result, a force for restoring the member for retaining the simulated eyeball 3 toward the normal state is generated, and it is possible to reproduce a restoring force of a human eye that is present during actual glaucoma surgery.

The "normal state" in the first embodiment is the position at which the member for retaining the simulated eyeball 3 is inserted without decentering the simulated-eyeball pedestal 2, or in other words, the position at which the member for retaining the simulated eyeball 3 most stably rests in the recess 21. For example, in the embodiment illustrated in FIG. 1A, the position at which a vertex 31 of an outer circumferential surface of the substantial hemisphere of the member for retaining the simulated eyeball 3 and a vertex 22 of the substantially hemispherical surface of the recess 21 of the simulated-eyeball pedestal 2 coincide can be defined as the normal state. The second magnets 42 have a predetermined weight, and the second magnets 42 are therefore preferably disposed equidistant from the vertex 31 of the substantially hemispherical surface of the member for retaining the simulated eyeball 3. When the substantially hemispherical cup-shaped member for retaining the simulated eyeball 3 illustrated in FIG. 2A is used, two or more second magnets 42 may be disposed on a spherical surface of the substantially hemispherical cup, or a ring-shaped second magnet 42 may be disposed as illustrated in FIG. 2C. When the member for retaining the simulated eyeball 3 illustrated in FIG. 2B is used, the second magnets 42 should be disposed in the plate-shaped members 32 in the manner illustrated in FIG. 2D.

During glaucoma surgery, a thread is passed through the eyeball and the eyeball is rotated 5 to 50 degrees in an eye socket. Therefore, the mechanism for generating the restoring force 4 may be provided to generate a force for perpetually restoring the member for retaining the simulated eyeball 3 toward the normal state, and the mechanism for generating the restoring force 4 may be configured to function, i.e., to generate a restoring force, at least when the member for retaining the simulated eyeball 3 is rotated 5 to 50 degrees. In the present specification, the phrase "force for restoring toward the normal state" does not mean restoration to the normal-state position, but rather refers to a force directed toward the normal state relative to the position at which the restoring force was generated. In the first embodiment, "5 to 50 degrees" refers to an angle formed by the intersection of the lines normal to the vertex 22 of the recess 21 and the vertex 31 of the member for retaining the simulated eyeball 3, as indicated by X in FIG. 1B. The angle at which restoring force is generated is also not an angle through which the restoring force persists, but rather is an angle at which the restoring force is generated. For example, when it is noted that the angle at which the restoring force is generated is 5 to 50 degrees, this means that the restoring force is generated at any angle from 5 degrees to 50 degrees inclusive. The angle at which the restoring force is generated should be adjusted according to the positional relationship between the first magnet 41 and the second magnets 42.

For example, the second magnets 42 are disposed near end parts of the member for retaining the simulated eyeball 3 in FIG. 1A, but by disposing the second magnets 42 closer to the first magnet 41 than the positions illustrated in FIG. 1A, the angle X at which a repulsive force is generated can be decreased. Specifically, the angle at which the restoring force is generated in the mechanism for generating the restoring force 4 of the first embodiment can be set in a range of approximately 0 to 90 degrees by the arrangement of the first magnet 41 and the second magnets 42. Consequently, for application in glaucoma surgery, the angle should be set so that the restoring force is generated upon rotation of 5 to 50 degrees as described above, but the angle at which the restoring force is generated may be set in a wider range in the device for training in ophthalmic surgery 1A. A lower limit for the angle at which the restoring force is generated may be 0 degrees, 5 degrees, 10 degrees, 15 degrees, or another angle, for example. An upper limit for the angle at which the restoring force is generated may be 90 degrees, 80 degrees, 70 degrees, 60 degrees, 50 degrees, or another angle, for example.

The angle at which the restoring force is generated may also be adjusted by changing the shape/arrangement of the first magnet 41 rather than the second magnets 42. In the embodiment illustrated in FIG. 1, a substantially planar first magnet 41 is disposed in the simulated-eyeball pedestal 2, but the angle X at which the restoring force is generated may be decreased by configuring the first magnet 41 to have a substantially recessed shape, i.e., by increasing a height of a periphery of the first magnet 41, for example. Alternatively, a plurality of first magnets 41 may be provided and disposed in the simulated-eyeball pedestal 2 so that the repulsive force is generated at an expected angle X. The arrangement of both the first magnet 41 and the second magnets 42 may, of course, be adjusted. The first magnet 41 is built in to be integrated with the simulated-eyeball pedestal 2 in the embodiment illustrated in FIG. 1, but the first magnet 41 and the simulated-eyeball pedestal 2 may also be separate.

The mechanism for generating the restoring force may also be configured so that the repulsive force increases the greater the rotation angle is. For example, second magnets 42 having weak magnetic force may be disposed closer to the vertex 31 of the member for retaining the simulated eyeball 3, and second magnets 42 having relatively strong magnetic force may be disposed farther away from the vertex 31, as illustrated in FIG. 2D. Alternatively, a surface area of the second magnets 42 closer to the vertex 31 of the member for retaining the simulated eyeball 3 may be reduced, and a surface area of the second magnets 42 farther away from the vertex 31 may be enlarged. A single second magnet 42 may also be used, and the surface area thereof may be increased, or the magnetic force thereof increased, the farther the second magnet 42 is from the vertex 31. Likewise when the ring-shaped second magnet 42 illustrated in FIG. 2C is used, two or more ring-shaped second magnets 42 having different magnetic force or surface area may be used, or a single ring-shaped magnet may be used in which the magnetic force thereof increases the farther the magnet is from the vertex 31.

The mechanism for generating the restoring force 4 is formed from magnets in the first embodiment. Consequently, the simulated-eyeball pedestal 2 and the member for retaining the simulated eyeball 3 may be fabricated from any material other than a magnet or a magnetic body that acts on a magnet, and should be fabricated without any particular limitation from polycarbonate, polyacetal, polyoxymethylene, polytetrafluoroethylene, polyether ether ketone, or another resin.

Modification of the First Embodiment

Figure 3:
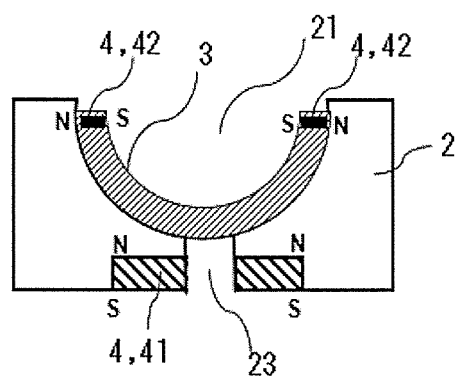
FIG. 3 is a schematic sectional view of a modification of the first embodiment.

FIG. 3 is a schematic sectional view of a modification of the first embodiment. The device for training in ophthalmic surgery 1A according to a modification of the first embodiment differs from the first embodiment in that a through hole 23 is formed in the simulated-eyeball pedestal 2. Forming the through hole 23 makes it possible for a light source unit to be provided in the device for training in ophthalmic surgery 1A and for light from the light source unit to be radiated to the simulated eyeball, as described hereinafter. A position at which the through hole 23 is formed is not particularly limited insofar as light can be radiated to the simulated eyeball, but the through hole 23 is preferably formed to penetrate from a bottom part of the simulated-eyeball pedestal 2 to a center of the recess 21. During surgical training, light can be uniformly radiated to the simulated eyeball as viewed from an operator. In the example illustrated in FIG. 3, a through hole is not formed in the member for retaining the simulated eyeball 3. Formation of a through hole is not particularly necessary when the member for retaining the simulated eyeball 3 is fabricated from a transparent resin, but a through hole may also be formed in the member for retaining the simulated eyeball 3 as needed. When the through hole 23 is provided in the simulated-eyeball pedestal 2, a doughnut-shaped magnet in which a hole is formed should be used as the first magnet 41.

Second Embodiment

A device for training in ophthalmic surgery 1B according to a second embodiment will be described with reference to FIGS. 4A and 4B. FIGS. 4A and 4B are schematic sectional views of the device for training in ophthalmic surgery 1B of the second embodiment.

The device for training in ophthalmic surgery 1B of the second embodiment differs from the device for training in ophthalmic surgery 1A of the first embodiment in being provided with elastic members instead of the first magnet 41 and second magnets 42 as the mechanism for generating the restoring force 4. In all other respects, the device for training in ophthalmic surgery 1B of the second embodiment is the same as the device for training in ophthalmic surgery 1A and the modification of the first embodiment. The description of the second embodiment will therefore focus on the elastic members, and repetitive description of other aspects of the configuration is omitted.

Figure 4:
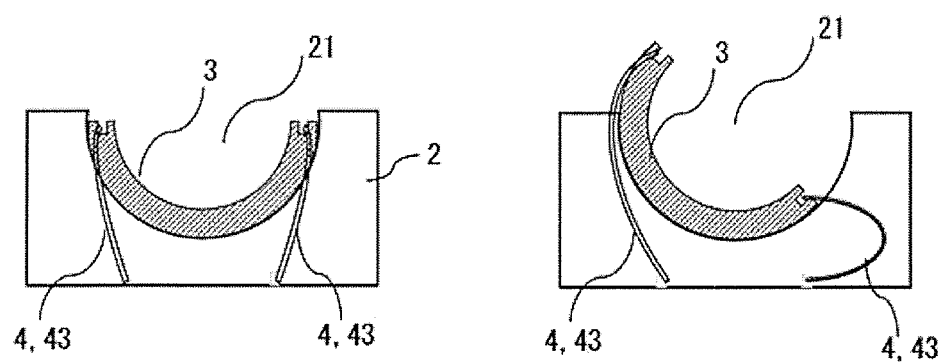
FIGS. 4A and 4B are schematic sectional views of a device for training in ophthalmic surgery 1B according to a second embodiment.

Rubber members 43 are used as the elastic members of the device for training in ophthalmic surgery 1B illustrated in FIG. 4. When the rubber members 43 are used, one end of each of the rubber members 43 should be fixed to the simulated-eyeball pedestal 2, and other ends thereof should be fixed to the member for retaining the simulated eyeball 3. When fixing the rubber members 43 to the simulated-eyeball pedestal 2, the rubber members 43 may be fixed to an outer circumferential surface of the simulated-eyeball pedestal 2, and although not illustrated in detail in FIG. 4, groove parts may be formed in the simulated-eyeball pedestal 2, and the rubber members 43 may be passed into the groove parts and fixed. Preferably, at least two rubber members 43 are used, and the embodiment is formed with each of the rubber members 43 at equal intervals.

In the second embodiment as well, the member for retaining the simulated eyeball 3 may be provided to be restored perpetually toward the normal state, and so that the restoring force is generated when the member for retaining the simulated eyeball 3 is rotated 5 to 50 degrees. A lower limit for the angle at which the restoring force is generated may be 0 degrees, 5 degrees, 10 degrees, 15 degrees, or another angle, for example, and an upper limit for the angle at which the restoring force is generated may be 90 degrees, 80 degrees, 70 degrees, 60 degrees, 50 degrees, or another angle, for example. Generation of the restoring force can be adjusted by a length of the rubber members 43.

Modification of the Second Embodiment

Figure 5:
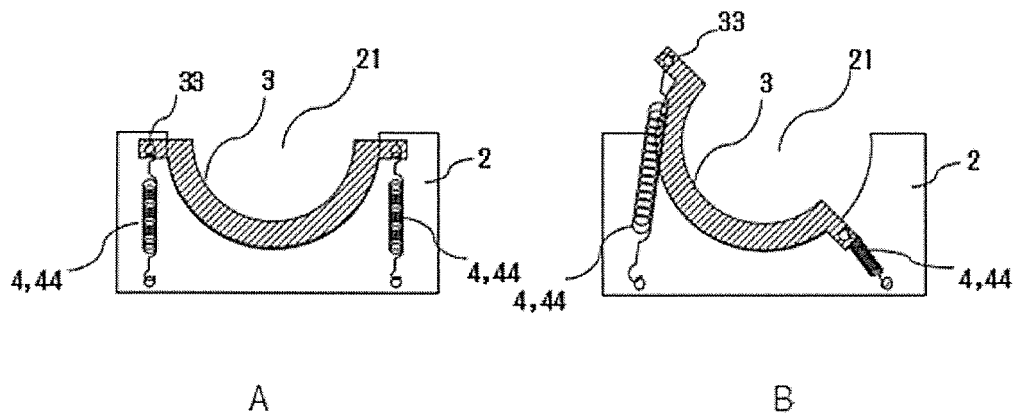
FIGS. 5A and 5B are schematic sectional views of a modification of the second embodiment.

FIGS. 5A and 5B are schematic sectional views of a modification of the second embodiment. The device for training in ophthalmic surgery 1B according to a modification of the second embodiment differs from the second embodiment in that springs 44 are used instead of the rubber members 43 as the elastic members. The springs 44 should be metal, plastic, or other passive springs (where the restoring force is generated by extending the springs). The angle at which the restoring force is generated can be adjusted by adjusting a length of the springs 44. In the modification of the second embodiment, attachment parts 33 for the springs 44 may be formed in end parts of the member for retaining the simulated eyeball 3 to facilitate fixing of one end of the springs 44, as illustrated in FIG. 5. The attachment parts 33 may be used in the second embodiment. The modification of the second embodiment is not limited to the springs 44, and may be a shape memory alloy actuator (SMA) or any other active drive device or the like, for example, that is not particularly limited insofar as the member is capable of extending and retracting. In the second embodiment and the modification thereof, the mechanism for generating the restoring force 4 does not use magnets. Consequently, the simulated-eyeball pedestal 2 and the member for retaining the simulated eyeball 3 may be made using stainless steel, copper, aluminum, and other metal materials, for example, in addition to the materials cited in the first embodiment.

Third Embodiment

A device for training in ophthalmic surgery 10 according to a third embodiment will be described with reference to FIGS. 6A and 6B. FIGS. 6A and 6B are schematic sectional views of the device for training in ophthalmic surgery 10 of the third embodiment.

The device for training in ophthalmic surgery 10 of the third embodiment differs from the device for training in ophthalmic surgery 1A of the first embodiment in that the member for retaining the simulated eyeball 3 is not provided, and a simulated eyeball 5 is directly inserted in the simulated-eyeball pedestal 2, and in that constituent elements of the mechanism for generating the restoring force 4 are disposed or attached at positions in the simulated eyeball 5 instead of in the member for retaining the simulated eyeball 3. In all other respects, the device for training in ophthalmic surgery 10 of the third embodiment is the same as the device for training in ophthalmic surgery 1A and the modification of the first embodiment, and the device for training in ophthalmic surgery 1B and the modification of the second embodiment. The description of the third embodiment will therefore focus on the simulated eyeball 5 and the mechanism for generating the restoring force 4, and repetitive description of other aspects of the configuration is omitted.

Figure 6:
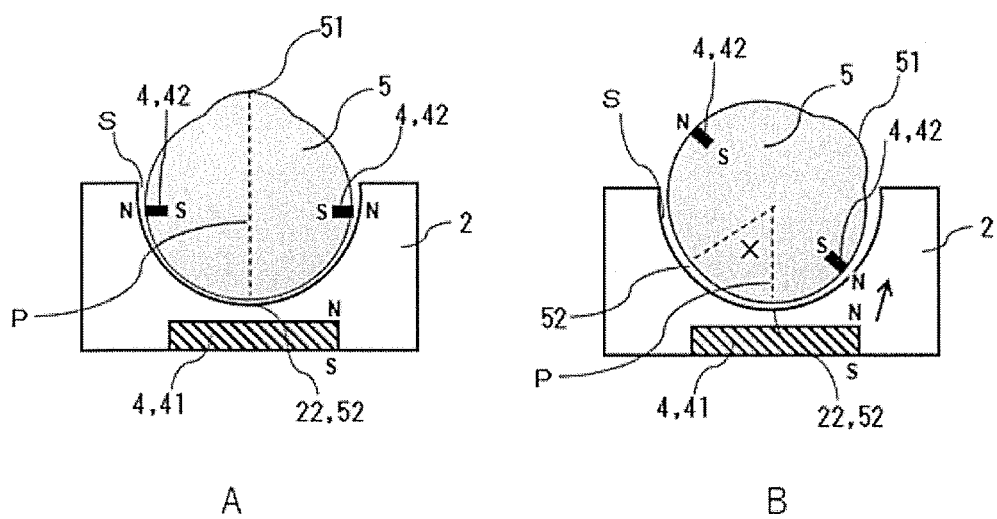
FIGS. 6A and 6B are schematic sectional views of a device for training in ophthalmic surgery 1C according to a third embodiment.

As illustrated in FIG. 6, the second magnets 42 are formed in the simulated eyeball 5 in the device for training in ophthalmic surgery 1C of the third embodiment. When a thread is passed through the simulated eyeball 5 and the simulated eyeball 5 is rotated, and a second magnet 42 in the simulated eyeball 5 thereby approaches the first magnet 41, a repulsive force is generated, a force restoring the simulated eyeball 5 toward the normal state is generated, and it is possible to reproduce a restoring force of a human eye that is present during actual glaucoma surgery.

The "normal state" in the third embodiment can be defined as the position at which the simulated eyeball 5 is inserted without decentering the simulated-eyeball pedestal 2, or in other words, the position at which a center 51 of a corneal region of the simulated eyeball 5 coincides with a normal line P of the vertex 22 of the substantially hemispherical surface of the recess 21 of the simulated-eyeball pedestal 2. When the simulated eyeball 5 is in the normal state, another point at which the normal line P and the simulated eyeball intersect is defined as a bottom part 52 of the simulated eyeball. In the third embodiment, "5 to 50 degrees" refers to an angle formed by the normal line P with a line connecting the bottom part 52 and the center 51 of the corneal region of the simulated eyeball 5, as indicated by X in FIG. 6B. A lower limit for the angle at which restoring force is generated may be 0 degrees, 5 degrees, 10 degrees, 15 degrees, or another angle, for example, and an upper limit for the angle at which restoring force is generated may be 90 degrees, 80 degrees, 70 degrees, 60 degrees, 50 degrees, or another angle, for example.

In the third embodiment illustrated in FIG. 6, an example is cited in which the first magnet 41 and the second magnets 42 are provided as the mechanism for generating the restoring force 4, but elastic members may also be used, as in the second embodiment and the modification thereof. When elastic members are used, the other ends of the elastic members should be fixed directly to the simulated eyeball 5 instead of to the member for retaining the simulated eyeball 3.

The device for training in ophthalmic surgery 1 of the above embodiment is provided with the mechanism for generating the restoring force 4 and can therefore be used in training for glaucoma surgery, but the device for training in ophthalmic surgery 1 can also be used for conventional surgery for cataract and the like. Consequently, a publicly known simulated eyeball fabricated for use in various types of surgery, or a simulated eyeball fabricated by combining publicly known simulated eyeball technologies can be used as the simulated eyeball 5. When the devices for training in ophthalmic surgery 1A, 1B of the first and second embodiments are used, a publicly known simulated eyeball 5 or a simulated eyeball 5 fabricated by combining publicly known simulated eyeball technologies should be inserted/retained in the member for retaining the simulated eyeball 3. When the device for training in ophthalmic surgery 10 of the third embodiment is used, the second magnets 42 should be disposed in a publicly known simulated eyeball 5 or a simulated eyeball 5 fabricated by combining publicly known simulated eyeball technologies, or the other ends of the elastic members should be fixed to the simulated eyeball 5.

As mentioned above, a sclera is thinly sliced during glaucoma surgery. Consequently, a simulated eyeball 5 in which a pseudo-sclera is formed in a white-of-the-eye portion on a periphery of the cornea is preferably used when training for glaucoma surgery using the device for training in ophthalmic surgery 1 of the above embodiment. A simulated sclera can be formed by layering a thin film formed from a synthetic resin material or an elastomer material, for example. The simulated eyeball 5 is typically fabricated from silicone or another flexible resin. Consequently, when the simulated eyeball 5 is inserted directly into the recess 21 of the simulated-eyeball pedestal 2, the simulated eyeball 5 is sometimes difficult to rotate due to friction. In this case, a lubricating oil or the like should be poured into a gap S between the simulated eyeball 5 and the recess 21 of the simulated-eyeball pedestal 2. The simulated-eyeball pedestal 2 should be formed from a material cited in the first and second embodiments.

Fourth Embodiment

Figure 7:
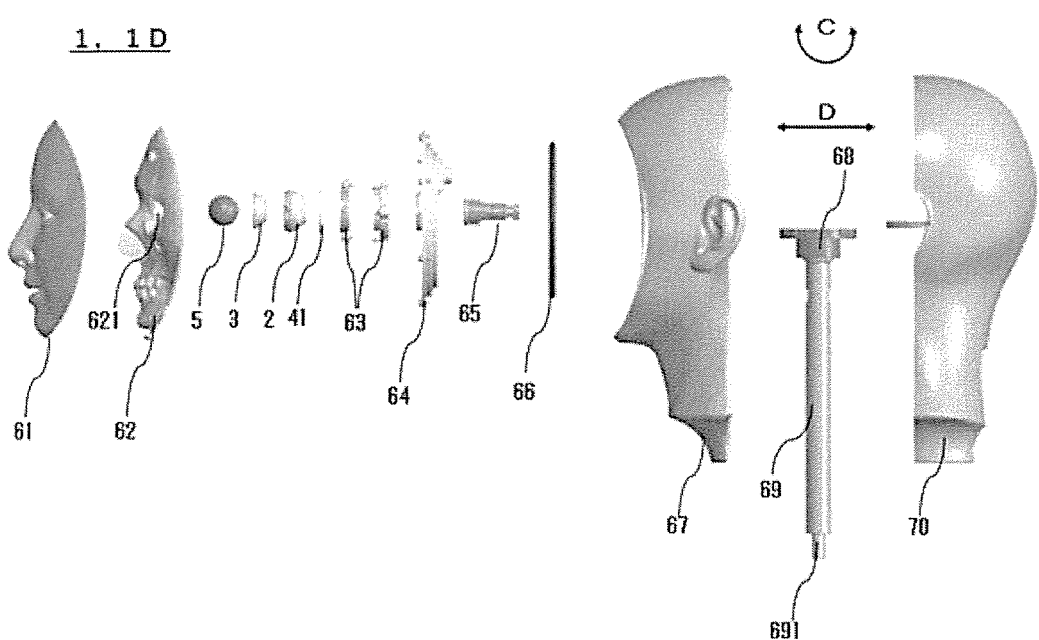
FIG. 7 is a schematic exploded view of a device for training in ophthalmic surgery 1D according to a fourth embodiment.

A device for training in ophthalmic surgery 1D according to a fourth embodiment will be described with reference to FIG. 7. FIG. 7 is a schematic exploded view of the device for training in ophthalmic surgery 1D of the fourth embodiment. Although it is possible to train for ophthalmic surgery using only the first through third embodiments, the fourth embodiment is a device for training in ophthalmic surgery 1 that more closely approximates actual surgery. In the example illustrated in FIG. 7, a face skin 61 simulating an epidermis of a face of a human body, a face plate 62 having a hole 621 for exposing the simulated eyeball 5, the simulated eyeball 5, the member for retaining the simulated eyeball 3 (including second magnets 42 not illustrated), the simulated-eyeball pedestal 2, the first magnet 41, receiving members 63 of the simulated-eyeball pedestal 2, a water receiving plate 64, a light source unit 65, a waterproofing rubber member 66, a front head unit 67 for engaging with the face plate 62, a ball head unit 68, a shaft 69, and a rear head unit 70 for engaging with the front head unit 67 are included. The abovementioned members can be combined as needed for use in the device for training in ophthalmic surgery 1D of the fourth embodiment.

For example, when the face plate 62 and the front head unit 67 are included in addition to the simulated eyeball 5, the member for retaining the simulated eyeball 3 used as needed, and the simulated-eyeball pedestal 2, an actual human face is approximated. The face plate 62 may furthermore be covered by the face skin 61.

Orientation of the face sometimes changes during actual surgery. The device for training in ophthalmic surgery 1D may therefore also be provided with an angle adjustment mechanism. FIG. 7 illustrates an angle adjustment mechanism pertaining to a first embodiment, which is constituted from the ball head unit 68 and the shaft 69. More specifically, the ball head unit 68 should be rotatably attached to the shaft 69, and the front head unit 67 and the rear head unit 70 should be fixed to the ball head unit 68. As indicated by an arrow C in FIG. 7, the front head unit 67 and the simulated eyeball 5 incorporated in an eye socket portion of the front head unit 67 can rotate centered about an axial direction of the shaft 69.

Alternatively, an angle adjustment mechanism pertaining to a second embodiment may be configured by fixing the ball head unit 68 to the shaft 69 to be non-rotatable, or fixing the front head unit 67 and the rear head unit 70 directly to the shaft 69 and rotatably attaching an end part 691 of the shaft 69 to a mount (not illustrated) of the shaft 69.

An angle adjustment mechanism pertaining to a third embodiment may also be configured by attaching the end part 691 of the shaft 69 to the mount (not illustrated) of the shaft 69 to be rotatable in a direction indicated by an arrow D in FIG. 7. In the third embodiment, the front head unit 67 and the simulated eyeball 5 incorporated in the eye socket portion of the front head unit 67 can move in a front-rear direction.

Alternatively, an angle adjustment mechanism pertaining to a fourth embodiment may be configured to enable rotation in any direction by forming the end part 691 of the shaft 69 to be spherical, for example, and inserting the end part 691 in a recess of the mount (not illustrated) of the shaft 69. The angle adjustment mechanisms of each embodiment above may be used singly or combined.

In actual surgery, surgery is sometimes performed while water is supplied to an eye. A configuration may therefore be adopted in which the water receiving plate 64 for receiving water that intrudes between the front head unit 67 and the simulated eyeball 5 is provided between the simulated-eyeball pedestal 2 and the front head unit 67, and the water in the water receiving plate 64 can be discharged to the outside of the device for training in ophthalmic surgery 1D by a drainage mechanism (not illustrated). The receiving members 63 of the simulated-eyeball pedestal 2 may be disposed between the simulated-eyeball pedestal 2 and the water receiving plate 64 as needed. The waterproofing rubber member 66 may furthermore be provided between the water receiving plate 64 and the front head unit 67, as needed, to prevent water that leaks from the water receiving plate 64 from intruding into the device for training in ophthalmic surgery 1D.

When using the simulated-eyeball pedestal 2 in which the through hole 23 is formed, the light source unit 65 may be provided. Light from the light source unit 65 is radiated to the simulated eyeball 5 via the through hole 23, and convenience of surgery training is thereby enhanced. The light source unit 65 can also be used as a light source of a photoelasticity application sensor, for measuring stress applied to the simulated eyeball 5. A photoelasticity application sensor is publicly known; see, for example, (1) "Research into ophthalmic surgery technique evaluation using a sensor-equipped eyeball model", Journal of Japan Society of Computer Aided Surgery, Vol. 16, No. 3, pp. 332-333, 2014 (reference URL: https://www.jstage.jst.go.jp/article/jscas/16/3/16_321/_article/-char/ja/), and (2) "Bionic Humanoid: Biomimetic Retina Model Having Photoelastic Stress Sensor," Proceedings of the 2017 JSME Conference on Robotics and Mechatronics, Fukushima, Japan, May 10-12, 2017 (on CD-ROM, 2A1-N10).

The face skin 61 should be fabricated from silicone or another soft resin. The face plate 62, the receiving members 63 of the simulated-eyeball pedestal 2, the water receiving plate 64, the front head unit 67, and the rear head unit 70 should be fabricated from a hard resin or the like. The ball head unit 68 and the shaft 69 should be fabricated from a metal or a hard resin. The device for training in ophthalmic surgery 1D of the fourth embodiment may be fabricated by an assembly method in which the components thereof are shaped to be able to fit with each other, or the device may be fabricated by fastening the components together using screws or the like.

Through the various embodiments disclosed in the present specification, it is possible to train for ophthalmic surgery in an environment that approximates actual surgery.

KEY 1, 1A, 1B, 1C, 1D device for training in ophthalmic surgery
2 simulated-eyeball pedestal
3 member for retaining simulated eyeball
4 mechanism for generating restoring force
5 simulated eyeball
21 recess
22 vertex of substantially hemispherical surface
23 through hole
31 vertex of simulated-eyeball retaining member 3
32 plate-shaped member
33 spring attachment part
41 first magnet
42 second magnet
43 rubber member
44 spring
51 center of corneal region of simulated eyeball
52 bottom part of simulated eyeball
61 face skin
62 face plate
63 receiving member of simulated-eyeball pedestal
64 water receiving plate
65 light source unit
66 waterproofing rubber member
67 front head unit
68 ball head unit
69 shaft
70 rear head unit
621 hole for exposing simulated eyeball

What is claimed is:

1. A device for training in ophthalmic surgery comprising:
   a simulated-eyeball pedestal having a recess;
   a simulated eyeball directly insertable into the recess of the simulated-eyeball pedestal or a member for retaining the simulated eyeball that retains the simulated eyeball and is insertable into the recess of the simulated-eyeball pedestal so that the simulated eyeball is indirectly inserted into the recess of the simulated-eyeball pedestal; and
   a mechanism for generating a restoring force that generates a force for restoring a position of the simulated eyeball or the member for retaining the simulated eyeball toward a normal state with respect to the simulated-eyeball pedestal, wherein:
   the simulated eyeball or the member for retaining the simulated eyeball rotates along the recess of the simulated-eyeball pedestal,
   the mechanism for generating the restoring force consists of:

a first magnet disposed in the simulated-eyeball pedestal or disposed outside the simulated-eyeball pedestal; and a second magnet disposed in the simulated eyeball or the member for retaining the simulated eyeball, the first magnet has a planar shape or a shape approximate to the recess and is disposed so that a planar surface or a recessed surface faces the simulated eyeball or the member for retaining the simulated eyeball, and the first magnet and the second magnet are disposed so that a restoring force is generated when the simulated eyeball or the member for retaining the simulated eyeball is rotated relative to the simulated-eyeball pedestal.

2. The device for training in ophthalmic surgery of claim 1, wherein:

the mechanism for generating the restoring force functions when the position of the simulated eyeball or the member for retaining the simulated eyeball is rotated 5 to 50 degrees from the normal state with respect to the simulated-eyeball pedestal.

3. The device for training in ophthalmic surgery of claim 2, wherein:

the second magnet is disposed further in an opening direction of the recess of the simulated-eyeball pedestal than the first magnet when the simulated eyeball or the member for retaining the simulated eyeball is inserted in the simulated-eyeball pedestal to be in the normal-state position.

4. The device for training in ophthalmic surgery of claim 1, wherein:

the second magnet is disposed further in an opening direction of the recess of the simulated-eyeball pedestal than the first magnet when the simulated eyeball or the member for retaining the simulated eyeball is inserted in the simulated-eyeball pedestal to be in the normal-state position.

5. The device for training in ophthalmic surgery of claim 1, wherein:

a through hole is formed in the simulated-eyeball pedestal.

6. The device for training in ophthalmic surgery of claim 1, further comprising:

a face plate having a hole for exposing the simulated eyeball; and a front head unit for engaging with the face plate.

7. The device for training in ophthalmic surgery of claim 6, further comprising:

an angle adjustment mechanism for adjusting an angle of the face plate.

8. The device for training in ophthalmic surgery of claim 1, wherein each of the first and second magnets is a permanent magnet.

9. A device for training in ophthalmic surgery comprising:

a simulated-eyeball pedestal having a recess;

a simulated eyeball directly insertable into the recess of the simulated-eyeball pedestal or a member for retaining the simulated eyeball that retains the simulated eyeball and is insertable into the recess of the simulated-eyeball pedestal so that the simulated eyeball is indirectly inserted into the recess of the simulated-eyeball pedestal; and a mechanism for generating a restoring force that generates a force for restoring a position of the simulated eyeball or the member for retaining the simulated eyeball toward a normal state with respect to the simulated-eyeball pedestal, wherein:

the simulated eyeball or the member for retaining the simulated eyeball rotates along the recess of the simulated-eyeball pedestal, and the mechanism for generating the restoring force consists of two or more springs, one end of each of which is fixed to the simulated-eyeball pedestal, and another end of each of which is fixed to the simulated eyeball or the member for retaining the simulated eyeball.

10. The device for training in ophthalmic surgery of claim 9, wherein:

a through hole is formed in the simulated-eyeball pedestal.

11. The device for training in ophthalmic surgery of claim 9, further comprising:

a face plate having a hole for exposing the simulated eyeball; and a front head unit for engaging with the face plate.

12. The device for training in ophthalmic surgery of claim 11, further comprising:

an angle adjustment mechanism for adjusting an angle of the face plate.

* * * * *